United States Patent
Park et al.

(10) Patent No.: US 11,680,693 B2
(45) Date of Patent: Jun. 20, 2023

(54) REAR LAMP MODULE FOR VEHICLE AND REAR COMBINATION LAMP HAVING SAME

(71) Applicant: AMOSENSE CO., LTD, Cheonan-si (KR)

(72) Inventors: Jin-Pyo Park, Seoul (KR); Won-San Na, Seoul (KR)

(73) Assignee: AMOSENSE CO., LTD, Cheonan-si (KR)

(*) Notice: Subject to any disclaimer, the term of this patent is extended or adjusted under 35 U.S.C. 154(b) by 0 days.

(21) Appl. No.: 16/968,550

(22) PCT Filed: Jan. 18, 2019

(86) PCT No.: PCT/KR2019/000756
§ 371 (c)(1),
(2) Date: Aug. 7, 2020

(87) PCT Pub. No.: WO2019/156387
PCT Pub. Date: Aug. 15, 2019

(65) Prior Publication Data
US 2021/0041078 A1 Feb. 11, 2021

(30) Foreign Application Priority Data

Feb. 8, 2018 (KR) .......................... 10-2018-0015878

(51) Int. Cl.
*F21S 43/239* (2018.01)
*F21S 43/245* (2018.01)
(Continued)

(52) U.S. Cl.
CPC .......... *F21S 43/239* (2018.01); *B60Q 1/0088* (2013.01); *B60Q 1/2607* (2013.01);
(Continued)

(58) Field of Classification Search
CPC ........ F21S 43/239; F21S 43/245; F21S 43/26; F21S 43/31; B60Q 1/0088; B60Q 1/2607; B60Q 1/30
See application file for complete search history.

(56) References Cited

U.S. PATENT DOCUMENTS 4,420,797 A * 12/1983 Tohata ..................... B60J 5/101
362/543
9,849,824 B2 12/2017 Anderson
(Continued)

FOREIGN PATENT DOCUMENTS

CN 106979493 A 7/2017
CN 107152645 A 9/2017
(Continued)

OTHER PUBLICATIONS

CN Office Action dated Aug. 31, 2021 as received in Application No. 201980010849.8.
(Continued)

*Primary Examiner* — Evan P Dzierzynski
*Assistant Examiner* — Nathaniel J Lee
(74) *Attorney, Agent, or Firm* — Maschoff Brennan

(57) ABSTRACT

A rear combination lamp installed on a vehicle comprises: a first rear lamp module installed on a later part of the rear side of the vehicle; and a second rear lamp module installed on a back door located at the rear side of the vehicle to be arranged adjacent to the first rear lamp module. The first rear lamp module includes a main light source and a sub-light source. The main light source generates light output from the first rear lamp module, and the sub-light source generates light provided to the second rear lamp module. The second rear lamp module includes a light reception unit and a light direction changing unit. The light reception unit receives light from the sub-light source. The light direction changing
(Continued)

unit changes a progressing direction of light received in the light reception unit to output light to the outside.

6 Claims, 5 Drawing Sheets

(51) Int. Cl.
    *F21S 43/31* (2018.01)
    *F21S 43/20* (2018.01)
    *B60Q 1/00* (2006.01)
    *B60Q 1/26* (2006.01)
    *B60Q 1/30* (2006.01)
    *B60Q 1/34* (2006.01)
    *B60Q 1/44* (2006.01)

(52) U.S. Cl.
    CPC .............. *B60Q 1/30* (2013.01); *F21S 43/245* (2018.01); *F21S 43/26* (2018.01); *F21S 43/31* (2018.01); *B60Q 1/2696* (2013.01); *B60Q 1/34* (2013.01); *B60Q 1/44* (2013.01)

(56) References Cited

U.S. PATENT DOCUMENTS

| | | | | |
|---|---|---|---|---|
| 2007/0086207 A1* | 4/2007 | Cassarly | ............. | G02B 6/0025 362/600 |
| 2011/0242831 A1* | 10/2011 | Okui | ........................ | F21S 43/14 362/511 |
| 2015/0292704 A1* | 10/2015 | Koshiro | ................ | F21S 43/237 362/511 |
| 2017/0129386 A1* | 5/2017 | Anderson | ............ | B60Q 1/0011 |
| 2017/0268741 A1* | 9/2017 | Happy | .................. | F21S 43/195 |
| 2018/0361914 A1* | 12/2018 | Miller | .................... | B60Q 1/304 |
| 2020/0158309 A1 | 5/2020 | Noh et al. | | |

FOREIGN PATENT DOCUMENTS

| | | |
|---|---|---|
| JP | 2013-256140 A | 12/2013 |
| JP | 2014-067514 A | 4/2014 |
| KR | 20-1998-0045596 U | 9/1998 |
| KR | 10-2008-0029368 A | 4/2008 |
| KR | 20-2014-0000100 U | 1/2014 |
| KR | 10-2014-0078372 A | 6/2014 |
| KR | 10-2017-0083334 A | 7/2017 |
| WO | 2017/142181 A1 | 8/2017 |

OTHER PUBLICATIONS

Korean Office Action dated Jul. 24, 2022 as received in application No. 10-2018-0015878.
KR Office Action dated Jan. 27, 2023 as received in Application No. 10-2018-0015878.

* cited by examiner

[FIG. 1]
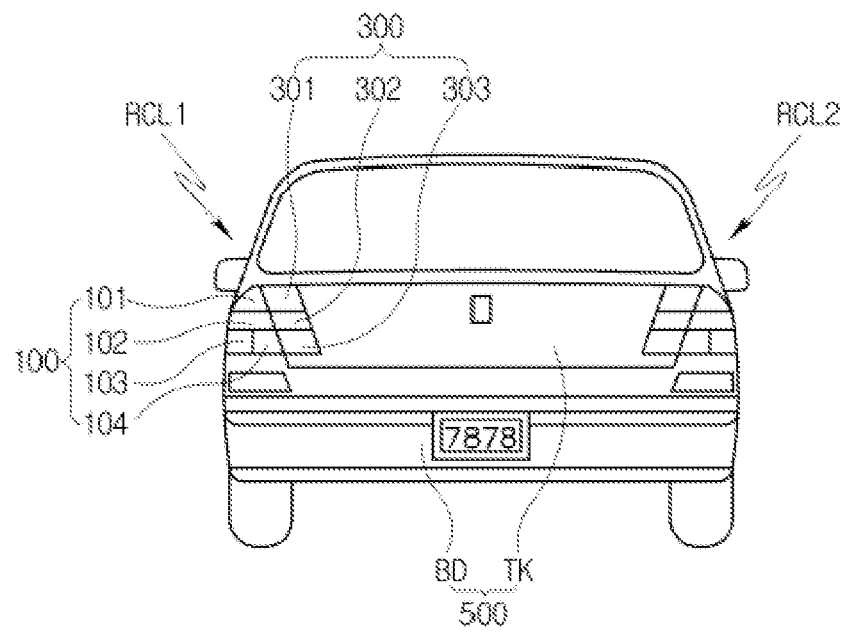

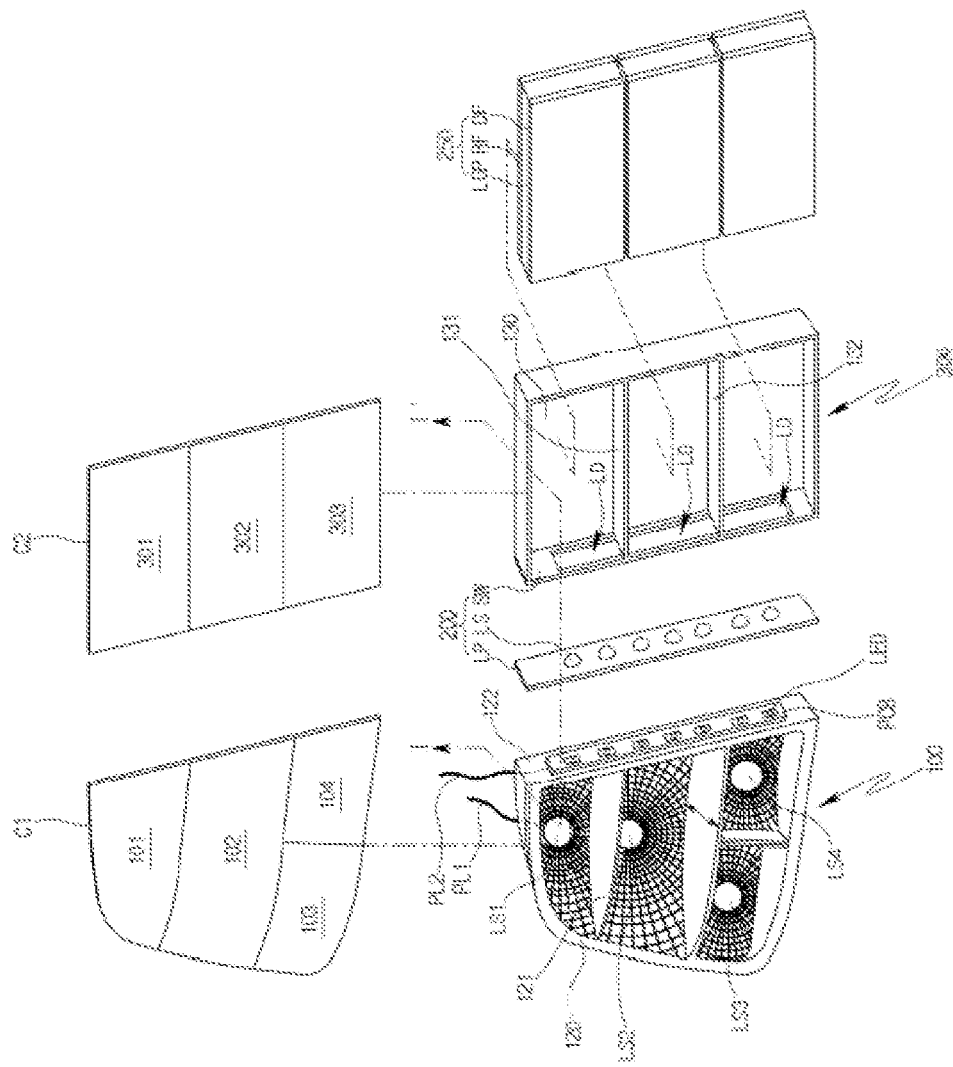
[FIG. 2]

[FIG. 3]
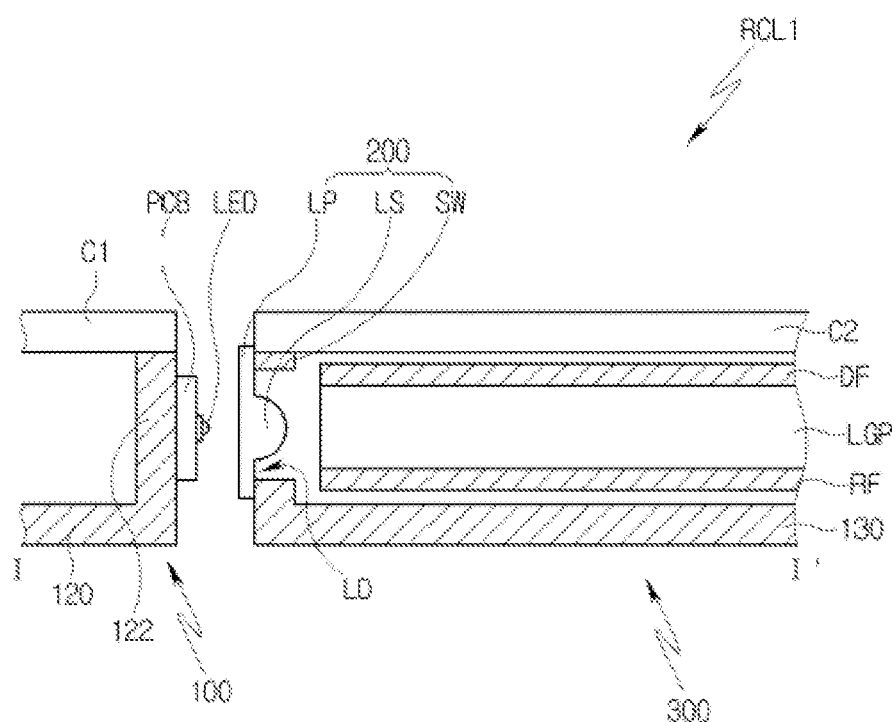

[FIG. 4]
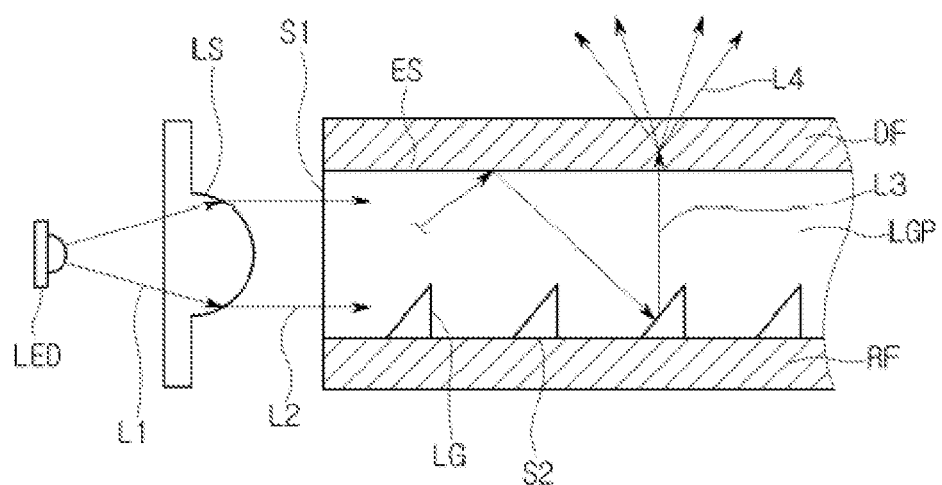

[FIG. 5]
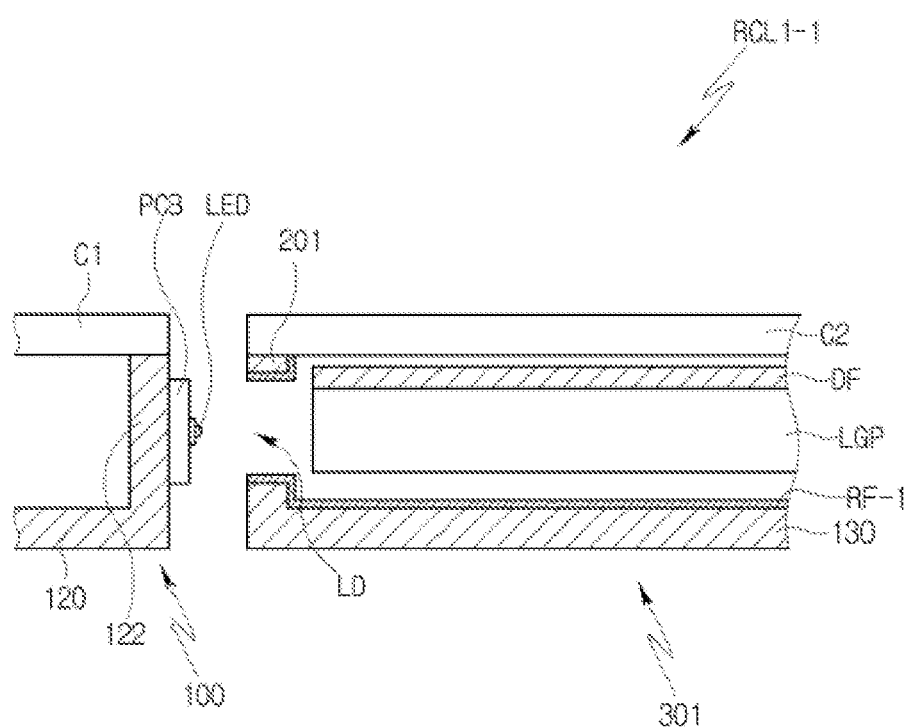

REAR LAMP MODULE FOR VEHICLE AND REAR COMBINATION LAMP HAVING SAME

TECHNICAL FIELD

The present disclosure relates to a rear lamp module for a vehicle and a rear combination lamp having the same, and more particularly, to a rear lamp module for a vehicle installed on a back door located at the rear of the vehicle and a rear combination lamp having the same.

BACKGROUND ART

A rear combination lamp is installed at the rear of the main body of a vehicle, and the rear combination lamp provides a driver of a following vehicle with information related to a traveling situation of the vehicle, such as turning, stopping, and reversing of the vehicle. Generally, the rear combination lamp is composed of a tail light, a braking light, a reversing light, and a direction indicator light, and the rear combination lamp may be installed on the rear of the main body of the vehicle by integrally housing such a plurality of lamps.

Meanwhile, as the design of the vehicle has become important in recent years, the design of the rear combination lamp is also being changed variously. Accordingly, rear combination lamps having more various designs, which are installed not only on both side portions of the rear of the main body of the vehicle but also on the back door, have been developed.

DISCLOSURE

Technical Problem

An object of the present disclosure is to provide a rear lamp module for a vehicle having a simplified installation operation and a reduced installation cost and a rear combination lamp having the same.

Technical Solution

A configuration of a rear combination lamp which is installed in a vehicle for achieving the object of the present disclosure is as follows. The rear combination lamp includes: a first rear lamp module which is installed on the side portion of the rear of the vehicle and a second rear lamp module which is installed on a back door located at the rear of the vehicle and disposed adjacent to the first rear lamp module.

The first rear lamp module includes a main light source and a sub-light source. The main light source generates light output from the first rear lamp module. The sub-light source generates light provided toward the second rear lamp module.

The second rear lamp module includes a light reception unit and a light direction changing unit. The light reception unit receives light from the sub-light source. The light direction changing unit changes a progressing direction of light received by the light reception unit to output light to the outside.

In an exemplary embodiment of the present disclosure, the main light source faces the front of the first rear lamp module, and the sub-light source faces the second rear lamp module.

In an exemplary embodiment of the present disclosure, the light direction changing unit includes a light guiding member which guides light received by the light reception unit side to the outside.

In an exemplary embodiment of the present disclosure, the light direction changing unit further includes a reflective member having a reflective surface facing the light guiding member.

In an exemplary embodiment of the present disclosure, the second rear lamp module further includes an accommodating unit which accommodates the light direction changing unit.

In an exemplary embodiment of the present disclosure, the reflective member is coated on the inner surface of the accommodating unit.

In an exemplary embodiment of the present disclosure, the light direction changing unit further includes a diffusion member which overlaps the light guiding member and diffuses light guided by the light guiding member.

In an exemplary embodiment of the present disclosure, the second rear lamp module further includes an accommodating unit which accommodates the light direction changing unit. Further, the light reception unit includes a sidewall which is coupled to one side of the accommodating unit adjacent to the sub-light source, and an opening through which light passes is defined in the sidewall.

In an exemplary embodiment of the present disclosure, the light reception unit includes a lens which is disposed between the sub-light source and the light direction changing unit.

In an exemplary embodiment of the present disclosure, the first rear lamp module further includes: a first power line which is electrically connected to the main light source and a second power line which is electrically connected to the sub-light source, and the first power line and the second power line are taken out to the outside through the accommodating unit.

A rear lamp module for a vehicle which is installed on a back door located at the rear of the vehicle, the rear lamp module for the vehicle for achieving the object of the present disclosure includes a light reception unit and a slight direction changing unit. The light reception unit receives light from another lamp module installed on the side portion of the rear of the vehicle. Further, the light direction changing unit changes a progressing direction of light received by the light reception unit to output light to the outside.

In an exemplary embodiment of the present disclosure, the light direction changing unit includes a light guiding member, a reflective member, and a diffusion member. The light guiding member guides light received by the light reception unit side to the outside. The reflective member has a reflective surface facing the light guiding member. The diffusion member faces the reflective member with the light guiding member interposed therebetween, and the diffusion member diffuses light guided by the light guiding member.

In an exemplary embodiment of the present disclosure, the rear lamp module further includes an accommodating unit which accommodates the light direction changing unit. Further, the light reception unit includes a sidewall which is coupled to one side of the accommodating unit, and an opening having a shape opened to the outside is defined in the sidewall.

In an exemplary embodiment of the present disclosure, the light reception unit may include a lens which is disposed at one side of the light direction changing unit.

Advantageous Effects

According to the present disclosure, the first rear lamp module installed on the side portion of the rear of the vehicle is lighted in the self-emission type by including the light source, but the second rear lamp module installed on the back door located at the rear of the vehicle does not include the light source, and the second rear lamp module receives light from the light source provided in the first rear lamp module and is lighted in the non-self-emitting type.

Accordingly, the power wiring for driving the rear combination lamp composed of the first rear lamp module and the second rear lamp module is provided only in the first rear lamp module, and the power wiring for driving the second rear lamp module is not required, and as a result, the wiring structure of the rear combination lamp may be simplified. Particularly, since the structure of the power wiring for driving the second rear lamp module may be removed from the back door of the vehicle, the wiring structure of the vehicle may be largely simplified, thereby simplifying the manufacturing process of the vehicle, and reducing the manufacturing cost of the vehicle.

DESCRIPTION OF DRAWINGS

FIG. 1 is a diagram illustrating a rear combination lamp installed in a vehicle according to an exemplary embodiment of the present disclosure.

FIG. 2 is an exploded perspective diagram of the rear combination lamp illustrated in FIG. 1.

FIG. 3 is a cross-section diagram illustrating the surface taken along the line I-I' illustrated in FIG. 2.

FIG. 4 is a diagram illustrating a process in which light emitted from a sub-light source illustrated in FIG. 3 is guided by a light guiding plate.

FIG. 5 is a cross-sectional diagram of a rear combination lamp according to another exemplary embodiment of the present disclosure.

MODE FOR INVENTION

Hereinafter, exemplary embodiments of the present disclosure will be described in detail with reference to the accompanying drawings. The objects, features, and effects of the present disclosure described above may be understood through exemplary embodiments related to the drawings. However, the present disclosure is not limited to the exemplary embodiments described herein, and may also be applied and modified in various forms. Rather, the exemplary embodiments of the present disclosure to be described later are provided to further clarify the technical spirit disclosed by the present disclosure, and furthermore to sufficiently convey the technical spirit of the present disclosure to those skilled in the art to which the present disclosure pertains. Accordingly, it should not be construed that the scope of the present disclosure is limited by the exemplary embodiments to be described later. Meanwhile, the same reference numerals in the following exemplary embodiments and drawings denote the same components.

Further, terms such as 'first' and 'second' in the present specification have no limited meanings and are used for the purpose of distinguishing one component from another component. Further, when a portion such as a film, a region, or a component is referred to as being "above" or "on" another portion, this includes not only a case where the portion is located directly on the other portion, but also a case where other films, regions, components, and the like are interposed therebetween.

Referring to FIG. 1, two rear combination lamps RCL1, RCL2 are installed on both sides of the rear of a vehicle 500. The two rear combination lamps RCL1, RCL2 are installed in the vehicle 500 having a back door at the rear of a main body BD, and in the present exemplary embodiment, the two rear combination lamps RCL1, RCL2 may be installed in the vehicle 500 in which a trunk door TK is installed on the main body BD.

In the present exemplary embodiment, the two rear combination lamps RCL1, RCL2 may have a structure in which the two rear combination lamps RCL1, RCL2 are installed at different locations in the vehicle 500 but correspond to each other. Accordingly, the structure of one rear combination lamp RCL1, installed on the left of the rear of the main body BD, of the two rear combination lamps RCL1, RCL2 will be described below, and the description of the structure of the other rear combination lamp RCL2 installed on the right of the rear of the main body BD will be omitted.

The rear combination lamp RCL1 includes a first rear lamp module 100 and a second rear lamp module 300. The first rear lamp module 100 is installed on the side portion of the rear of the main body BD to output information related to the traveling of the vehicle 500 backward from the vehicle 500 as light to provide the information to a driver of a following vehicle.

In the present exemplary embodiment, the entire lighting area of the first rear lamp module 100 includes a first main lighting area 101, a second main lighting area 102, a third main lighting area 103, and a fourth main lighting area 104.

In the present exemplary embodiment, as the first main lighting area 101 is lighted, the location of the rear of the vehicle 500 may be informed to the driver of the following vehicle; as the second main lighting area 102 is lighted, the braking of the vehicle 500 may be informed to the driver of the following vehicle; as the third main lighting area 103 is lighted, the direction turning of the vehicle 500 may be informed to the driver of the following vehicle; and as the fourth main lighting area 104 is lighted, the reverse of the vehicle 500 may be informed to the driver of the following vehicle.

As described above, in the present exemplary embodiment, the entire lighting area of the first rear lamp module 100 includes the first to fourth main lighting areas 101, 102, 103, 104 which inform the aforementioned specific information, but the present disclosure is not limited to the configuration of the lighting areas of the first rear lamp module 100. For example, in another exemplary embodiment, a plurality of first main lighting areas 101 may be provided so that the plurality of first main lighting areas may be driven integrally in conjunction with each other, and in still another exemplary embodiment, the second main lighting area 102 may be divided into two lighting areas and the two lighting areas are driven independently of each other to inform the driver of the following vehicle of different traveling information of the vehicle 500.

In the present exemplary embodiment, the second rear lamp module 300 includes a first sub-lighting area 301, a second sub-lighting area 302 and a third sub-lighting area 303. In the present exemplary embodiment, the first sub-lighting area 301 may be driven integrally in conjunction with the first main lighting area 101, and the first sub-lighting area 301 may inform the driver of the following vehicle of the location of the rear of the vehicle 500. The second sub-lighting area 302 may be driven integrally in conjunction with the second main lighting area 102, and the second sub-lighting area 302 may inform the driver of the following vehicle of the braking of the vehicle 500. The third sub-lighting area 303 may be driven integrally in conjunction with the third main lighting area 103, and the third sub-lighting area 303 may inform the driver of the following vehicle of the direction turning of the vehicle 500.

The first rear lamp module 100 includes a light source as a component and is lighted in a self-emission type. However, the second rear lamp module 300 does not include a light source as a component, and the second rear lamp module 300 receives light from a light source provided in the first rear lamp module 100 and is lighted in a non-self-emission type. Accordingly, the power lines for providing power toward the rear combination lamp RCL1 which is composed of the first rear lamp module 100 and the second rear lamp module 300 are installed on the main body BD of the vehicle 500 in which the first rear lamp module 100 is disposed, and the installation of the power lines on the trunk door TK may be omitted.

Hereinafter, a structure of the first rear lamp module 100 and the second rear lamp module 300 will be described in more detail with reference to FIGS. 2 and 3.

Referring to FIGS. 2 and 3, the first rear lamp module 100 includes a first accommodating unit 120, a plurality of partition walls 121, a first main light source LS1, a second main light source LS2, a third main light source LS3, a fourth main light source LS4, sub-light sources LED, and a first cover unit C1.

The first accommodating unit 120 accommodates the first to fourth main light sources LS1, LS2, LS3, LS4. Further, the inner surface of the first accommodating unit 120 is coated with a reflective layer and light emitted from the first to fourth main light sources LS1, LS2, LS3, LS4 may be reflected to the front of the first rear lamp module 100. Accordingly, the amount of light output through the first to fourth main lighting areas 101, 102, 103, 104 may be increased.

Each of the plurality of partition walls 121 extends approximately vertically from the bottom of the first accommodating unit 120. Accordingly, an interior space of the first accommodating unit 120 may be partitioned into a plurality of interior spaces by the plurality of partition walls 121. In the present exemplary embodiment, the plurality of partition walls 121 may be made of a material which reflects light, such as a white mold, thereby preventing light from being mixed with each other in the plurality of interior spaces of the first accommodating unit 120 which are partitioned by the plurality of partitions walls 121 to clarify the shapes which are lighted in the first to fourth main lighting areas 101, 102, 103, 104.

The first to fourth main light sources LS1, LS2, LS3, LS4 are disposed to have a one-to-one correspondence with the first to fourth main lighting areas 101, 102, 103, 104. The first rear lamp module 100 is lighted using light emitted from the first to fourth main light sources LS1, LS2, LS3, LS4, and the light emission surface of each of the first to fourth main light sources LS1, LS2, LS3, LS4 may be directed toward the front of the first rear lamp module 100.

In the present exemplary embodiment, the first to fourth main light sources LS1, LS2, LS3, LS4 receive power through different power lines, and accordingly, the first to fourth main light sources LS1, LS2, LS3, LS4 may be lighted independently of each other. Further, the power lines electrically connected to each of the first to fourth main light sources LS1, LS2, LS3, LS4 may be taken out to the outside through a through hole which is defined in the first accommodating unit 120 to be electrically connected to an external power supply apparatus.

For example, the first main light source LS1 may be electrically connected to a first power line PL1; the first power line PL1 may be taken out to the outside through the through hole which is formed in the first accommodating unit 120; and the first power line PL1 taken out to the outside may be electrically connected to the power supply apparatus such as a battery and a generator installed in the vehicle.

The light emission surface of each of the sub-light sources LED faces the second rear lamp module 300, and the sub-light sources LED provide light toward the second rear lamp module 300. The sub-light sources LEDs are components provided in the first rear lamp module 100, but the light provided from the sub-light sources LEDs is not used to light the first rear lamp module 100, and light provided from the sub-light sources LEDs is used to light the second rear lamp module 300.

In the present exemplary embodiment, the sub-light sources LEDs may be fixed to one side portion 122 of the first accommodating unit 120 adjacent to the second rear lamp module 300. More specifically, a circuit board PCB may be coupled to the side portion 122 of the first accommodating unit 120, and the sub-light sources LEDs may be mounted on the circuit board PCB.

In the present exemplary embodiment, a second power line PL2 may be electrically connected to a connector (not illustrated) of the circuit board PCB; the second power line PL2 may be taken out to the outside of the first accommodating unit 120 through the through hole which is defined in the first accommodating unit 120; and the second power line PL2 taken out to the outside may be electrically connected to the power supply apparatus. Accordingly, the driving of the sub-light sources LEDs may be performed independently of the driving of the first to fourth main light sources LS1, LS2, LS3, LS4.

Further, in the present exemplary embodiment, the sub-light sources LEDs are classified into a plurality of groups, and the driving of the sub-light sources LEDs classified into the plurality of groups may be controlled by a driver (not illustrated) mounted on the circuit board PCB. Accordingly, the first to third sub-lighting areas 301, 302, 303 may be lighted independently of each other. For example, in the case of selectively driving only the two sub-light sources which are disposed on the top of the total seven sub-light sources LEDs illustrated in FIG. 2, the first sub-lighting area 301 is lighted, and the second and third sub-lighting areas 302, 303 may not be lighted.

The first cover unit C1 is coupled to the first accommodating unit 120 to cover the first to fourth main light sources LS1, LS2, LS3, LS4. The first cover unit C1 may be made of a material having light transmittance, for example, the first cover unit C1 may be made of polymethyl methacrylate (PMMA) or polycarbonate (PC). Accordingly, light emitted from the first to fourth main light sources LS1, LS2, LS3, LS4 may be emitted to the outside through the first cover unit C1.

In another exemplary embodiment, the first cover unit C1 may include an auxiliary cover unit (not illustrated) which covers the sub-light sources LEDs. In this case, the auxiliary cover unit may have a reflective surface which covers the sub-light sources LEDs, thereby preventing, by the auxiliary cover unit, light generated from the sub-light sources LEDs from being leaked to the outside through a gap between the first rear lamp module 100 and the second rear lamp module 300.

The second rear lamp module 300 includes a second accommodating unit 130, a first partition wall 131, a second partition wall 132, a light reception unit 200, light direction changing units 250, and a second cover unit C2.

In the present exemplary embodiment, the second accommodating unit 130 accommodates the light direction changing units 250, and each of the first partition wall 131 and the second partition wall 132 extends approximately vertically from the bottom of the second accommodating unit 130. More specifically, the first partition wall 131 is located at the interface between the first and second sub-lighting areas 301, 302, and the second partition wall 132 is located at the interface between the second and third sub-lighting areas 302, 303.

An interior space of the second accommodating unit 130 may be partitioned into a plurality of interior spaces by the first partition wall 131 and the second partition wall 132. Further, the first partition wall 131 and the second partition wall 132 are made of a material which reflects light, such as a white mold. Accordingly, light may be prevented from being mixed with each other in the interior spaces of the accommodating unit 130 which are partitioned by the first partition wall 131 and the second partition wall 132, thereby further clarifying the shapes which are lighted in the first to third sub-lighting areas 301, 302, 303.

The light reception unit 200 receives light from sub-light sources LEDs of the first rear lamp module 100. Light received from the sub-light source LED toward the light reception unit 200 is used by the second rear lamp module 300 to output light.

In the present exemplary embodiment, the light reception unit 200 may include a sidewall SW coupled to one side of the second accommodating unit 130 adjacent to the sub-light sources LEDs, and an opening LD through which light passes may be defined in the sidewall SW. When the second rear lamp module 300 is separated from the first rear lamp module 100, the opening LD may have a shape opened to the outside.

In another exemplary embodiment, the light reception unit 200 may also be defined by opening the entire portion of the second reception unit 130 facing and adjacent to the sub-light sources LEDs, and in still another exemplary embodiment, the light reception unit 200 may also be defined by forming the portion of the second reception unit 130 facing and adjacent to the sub-light sources LEDs with a material which transmits light.

In the present exemplary embodiment, the light reception unit 200 may further include a lens plate LP and lenses LSs. The lens plate LP may be coupled to the sidewall SW to face the sub-light sources LEDs. The lens plate LP may be made of a material having a light transmission property, for example, the lens plate LP may be made of a plastic, a glass, or a silicone such as polymethyl methacrylate (PMMA) or polycarbonate (PC).

The lenses LSs are arranged on the lens plate LP, and in the present exemplary embodiment, the lenses LSs are formed integrally with the lens plate LP so that the material of the lenses LSs may be the same as the material of the lens plate LP. In the present exemplary embodiment, each of the lenses LSs may condense light provided from the sub-light sources LEDs.

When the lenses LSs arranged on the lens plate LP are defined as a lens array and the sub-light sources LEDs arranged on the circuit board PCB are defined as a sub-light source array, the lens array is located between the sub-light source array and the opening LD, and the lens array faces the sub-light source array. Accordingly, the amount of light leaked to the neighbors of the opening LD may be minimized by the lenses LSs, thereby increasing the amount of light received through the opening LD.

The light direction changing units 250 convert a progressing direction of light received by the light reception unit 200 to output light to the outside. In the present exemplary embodiment, three light direction changing units 250 may be provided to have a one-to-one correspondence to the first sub-lighting area 301, the second sub-lighting area 302, and the third sub-lighting area 303. The three light direction changing units 250 in the second rear lamp module 300 have been disposed at different locations, but the three light direction changing units 250 may have a structure corresponding to each other. Accordingly, the light direction changing unit 250 disposed at the location corresponding to the first sub-lighting area 301 among the three light direction changing units 250 will be described as an example, and a description of the remaining light direction changing units is omitted.

The light direction changing unit 250 includes a light guiding member LGP, a reflective member RF, and a diffusion member DF. In the present exemplary embodiment, each of the light guiding member LGP, the reflective member RF, and the diffusion member DF is illustrated in a plate shape, but in another exemplary embodiment, at least any one of the light guiding member LGP, the reflective member RF and the diffusion member DF may also have a sheet or film shape.

Hereinafter, the configuration of the light direction changing unit 250 will be described in more detail with reference to FIG. 4 as follows.

Further referring to FIG. 4, light received by the light reception unit 200 is provided toward the light direction changing unit 250, and the light direction changing unit 250 changes the progressing direction of the provided light, and light in which the progressing direction is changed by the light direction changing unit 250 is output to the outside through the second cover unit C2.

More specifically, light is incident into the light guiding member LGP through an incident surface S1 of the light guiding member LGP, and the progressing direction of light incident on the light guiding member LGP is changed through light guiding patterns LGs defined on the rear surface of the light guiding member LGP. Further, light whose progressing direction is changed by the light guiding patterns LGs is emitted to the outside of the light guiding member LGP through an emission surface ES of the light guiding member LGP.

The reflective member RF has a reflective surface S2 facing the light guiding member LGP. The reflective member RF reflects light leaked through the rear surface of the light guiding member LGP toward the light guiding member LGP. Further, light reflected by the reflective member RF may be incident onward the light guiding member LGP again and output to the outside through the first to third sub-lighting areas 301, 302, 303.

The diffusion member DF faces the reflection member RF with the light guiding member LGP interposed therebetween. The diffusion member DF contains particles which reflect light, such as titanium dioxide, or the diffusion member DF includes an uneven pattern on the surface thereof. Accordingly, light may be diffused by the diffusion member DF, and accordingly, the luminance of light output from each of the first to third sub-lighting areas 301, 302, 303 may be uniform.

In another exemplary embodiment, the light direction changing unit 250 may further include an optical sheet. For example, the light direction changing unit 250 may further include a light collecting sheet having a prism pattern. In this case, the light collecting sheet may be disposed between the second cover unit C2 and the diffusion member DF to collect light emitted from the diffusion member DF in the front direction, thereby improving the luminance in the front direction in each of the first to third sub-lighting areas 301, 302, 303 by the light collecting sheet.

A process of changing the path of light emitted from the sub-light source LED by the aforementioned configuration of the light reception unit 200 and the light direction changing unit 250 will be described in detail as follows.

A first light L1 is generated from the sub-light source LED. Thereafter, the first light L1 is incident on the lens LS, and the first light L1 is condensed by the lens LS and thus a second light L2 is defined.

Thereafter, the second light L2 is incident into the light guiding member LGP through the incident surface S1 of the light guiding member LGP. Light incident on the light guiding member LGP is totally reflected inside the light guiding member LGP and thus a third light L3 is defined.

Thereafter, the third light L3 is reflected from the light guiding patterns LGs and the progressing direction thereof is changed to be emitted to the outside through the emission surface ES of the light guiding member LGP. The third light L3 is diffused by the diffusion member DF and thus a fourth light L4 may be defined.

The second cover unit C2 is coupled to the second accommodating unit 130 to cover the light direction changing unit 250 accommodated in the second accommodating unit 130. The second cover unit C2 may be made of the same material as the first cover unit C1 to have a light transmission property. Accordingly, light whose progressing direction is changed by the light direction changing unit 250 may be emitted to the outside through the second cover unit C2.

Referring to FIG. 5, cross sections of the first rear lamp module 100 and a second rear lamp module 301 of a rear combination lamp RCL1-1 for the vehicle according to another exemplary embodiment of the present disclosure are illustrated. More specifically, FIG. 5 illustrates a cross section of a portion in which the first rear lamp module 100 and the second rear lamp module 301 are connected to each other in the rear combination lamp RCL1-1, and the location of the cross section of the rear combination lamp RCL1-1 illustrate in FIG. 5 may correspond to the location of the cross section taken along the line I-I' of the rear combination lamp (RCL1 in FIG. 2) illustrated in FIG. 2.

Meanwhile, except for the configuration of the light reception unit 201 and a reflective member RF-1, the rear combination lamp RCL1-1 according to the present exemplary embodiment includes the same components as the aforementioned rear combination lamp (RCL1 in FIG. 2). Accordingly, in describing FIG. 5, reference numerals are denoted for the aforementioned components, and duplicate descriptions of the components are omitted.

In the present exemplary embodiment, the reflective member RF-1 has a shape coated on the inner surface of the accommodating unit 130. For example, the inner surface of the accommodating unit 130 may be coated with a material containing particles which reflect light, such as titanium dioxide, to implement the reflective member RF-1, or the inner surface of the accommodating unit 130 may be coated with a white paint to implement the reflective member RF-1.

In the present exemplary embodiment, the light reception unit 201 may include a sidewall which is coupled to one side of the second reception unit 130 adjacent to the sub-light sources LEDs, and the opening LD through which light passes is defined in the light reception unit 201. That is, when comparing the configurations of the light reception unit illustrated in FIG. 3 (200 in FIG. 3) and the light reception unit 201 illustrated in FIG. 5, the lens plate (LP in FIG. 3) and the lenses (LS in FIG. 3) may be omitted as components of the light reception unit 201.

Accordingly, even if no lenses are provided in the light reception unit 201, the sub-light sources LEDs are aligned in the opening LD, and when a separation distance between each of the sub-light sources LEDs and the light reception unit 201 is adjusted in consideration of a beam angle at which light is output from each of the sub-light sources LEDs, the amount of light leaked to the outside in the process in which light moves from the sub-light sources LEDs toward the light reception unit 201 may be minimized.

As described above, while the present disclosure has been described with reference to the exemplary embodiments, it may be understood by those skilled in the art that the present disclosure may be modified and changed variously without departing from the spirit and scope of the present disclosure described in the scope of the appended claims.

The invention claimed is:

1. A rear combination lamp installed on a vehicle, the rear combination lamp for the vehicle comprising:
   a first rear lamp module which is installed on a side portion of a rear of the vehicle; and
   a second rear lamp module which is installed on a back door located at the rear of the vehicle and disposed adjacent to the first rear lamp module,
   wherein the first rear lamp module comprises:
     a main light source which generates light emitted from the first rear lamp module; and
     a sub-light source which generates the light provided toward the second rear lamp module, and
   wherein the second rear lamp module comprises:
     a light reception unit which receives light from the sub-light source;
     a light switching unit which switches a progressing direction of the light received by the light reception unit to output the light to the outside; and
     a storage unit which stores the light switching unit,
   wherein the light switching unit comprises,
     a light guiding member which guides the light received by the light reception unit to the outside;
     a reflective member having a reflective surface facing the light guiding member;
     a diffusion member which overlaps the light guiding member and diffuses the light guided by the light guiding member; and
   a light collecting sheet disposed between a cover unit of the rear combination lamp and the diffusion member to collect the light emitted from the diffusion member in a front direction,
   wherein the light guiding member, the reflective member and the diffusion member are formed in a plate shape, and the light guiding member is disposed between the reflective member and the diffusion member,
   wherein a plurality of light guiding patterns are defined on a rear surface of the light guiding member, and are arranged according to the progressing direction of the light incident through the incident surface of the light guiding member,
   wherein the plurality of light guiding patterns switch the progressing direction of the light incident through the incident surface of the light guiding member to an emission surface of the light guiding member,
   wherein the storage unit is partitioned into a first sub-lighting area, a second sub-lighting area and a third sub-lighting area by a first partition wall and a second partition wall,
   wherein each of the first sub-lighting area, the second sub-lighting area and the third sub-lighting area stores a light switching unit, wherein the light reception unit comprises a sidewall which is coupled to one side adjacent to the sub-light source of the storage unit, wherein an opening through which the light passes is defined in the sidewall, wherein the light reception unit comprise a lens plate coupled to the sidewall and a plurality of lenses arranged on the lens plate, and wherein the plurality of lenses are inserted and disposed inside the storage unit through the opening of the storage unit to dispose between the sub-light source and the light switching unit.

2. The rear combination lamp for the vehicle of claim 1, wherein the main light source is installed to face the front of the first rear lamp module, and the sub-light source is installed to face the second rear lamp module.

3. The rear combination lamp for the vehicle of claim 1, wherein the plurality of lenses and sub-light sources are provided, respectively, and the plurality of lenses face the plurality of sub-light sources.

4. The rear combination lamp for the vehicle of claim 1, wherein the first rear lamp module further comprises:
a storage unit which stores the main light source; and
a cover unit which is coupled to the storage unit and covers the main light source, and
wherein the sub-light source is fixed to one side of the storage unit adjacent to the second rear lamp module.

5. The rear combination lamp for the vehicle of claim 4, wherein the first rear lamp module further comprises:
a first power line which is electrically connected to the main light source; and
a second power line which is electrically connected to the sub-light source, and
wherein the first power line and the second power line are taken out to the outside through the storage unit.

6. A rear lamp module for a vehicle which is installed on a back door located at the rear of the vehicle, the rear lamp module for the vehicle comprising:
a light reception unit which receives light from another lamp module installed on a side portion of a rear of the vehicle;
a light switching unit which switches a progressing direction of the light received by the light reception unit to output the light to the outside;
a storage unit which stores the light switching unit,
wherein the light switching unit comprises,
a light guiding member which guides the light received by the light reception unit to the outside;
a reflective member having a reflective surface facing the light guiding member; and
a diffusion member which faces the reflective member with the light guiding member interposed therebetween, and diffuses the light guided by the light guiding member; and
a light collecting sheet disposed between a cover unit of the rear lamp module for a vehicle and the diffusion member to collect the light emitted from the diffusion member in a front direction, wherein the light guiding member, the reflective member and the diffusion member are formed in a plate shape, and the light guiding member is disposed between the reflective member and the diffusion member, wherein a plurality of light guiding patterns are defined on a rear surface of the light guiding member, and are arranged according to the progressing direction of the light incident through the incident surface of the light guiding member, wherein the plurality of light guiding patterns switch the progressing direction of the light incident through the incident surface of the light guiding member to an emission surface of the light guiding member, wherein the storage unit is partitioned into a first sub-lighting area, a second sub-lighting area and a third sub-lighting area by a first partition wall and a second partition wall, wherein each of the first sub-lighting area, the second sub-lighting area and the third sub-lighting area stores a light switching unit, wherein the light reception unit comprises a sidewall which is coupled to one side of the storage unit, wherein an opening having a shape opened to the outside is defined in the sidewall, wherein the light reception unit comprise a lens plate coupled to the sidewall and lenses arranged on the lens plate, and wherein the lenses are inserted and disposed inside the storage unit through the opening to dispose between the sub-light source and the light switching unit.

* * * * *